United States Patent
Ryu et al.

(10) Patent No.: US 9,837,180 B2
(45) Date of Patent: Dec. 5, 2017

(54) CARBON NANO-MATERIAL PELLETS AND A METHOD FOR PREPARING THE PELLETS FROM POWDER OF CARBON NANO-MATERIAL

(71) Applicants: Sang Hyo Ryu, Daejeon (KR); Kwon Ju, Daejeon (KR); Nam Sun Choi, Daejeon (KR); Sang Kyu Choi, Daejeon (KR); Myung Wook Jung, Daejeon (KR); Yu Hyun Song, Daejeon (KR); Young Chan Jang, Daejeon (KR)

(72) Inventors: Sang Hyo Ryu, Daejeon (KR); Kwon Ju, Daejeon (KR); Nam Sun Choi, Daejeon (KR); Sang Kyu Choi, Daejeon (KR); Myung Wook Jung, Daejeon (KR); Yu Hyun Song, Daejeon (KR); Young Chan Jang, Daejeon (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 596 days.

(21) Appl. No.: 13/724,542

(22) Filed: Dec. 21, 2012

(65) Prior Publication Data
US 2013/0207051 A1 Aug. 15, 2013

(30) Foreign Application Priority Data
Feb. 13, 2012 (KR) .......................... 10-2012-0014514

(51) Int. Cl.
H01B 1/04 (2006.01)
H01B 1/24 (2006.01)
(Continued)

(52) U.S. Cl.
CPC ................. *H01B 1/04* (2013.01); *B29B 9/08* (2013.01); *B29B 9/14* (2013.01); *B29C 43/003* (2013.01);
(Continued)

(58) Field of Classification Search
CPC . H01B 1/04; H01B 1/24; B82Y 40/00; B82Y 30/00; C01B 31/02
(Continued)

(56) References Cited

U.S. PATENT DOCUMENTS 4,975,261 A    12/1990   Takabatake
5,844,037 A * 12/1998   Lundgard ................ C08J 3/226
                                                                         252/511
(Continued)

FOREIGN PATENT DOCUMENTS

CN   1477058 A   2/2004
CN   1683131 A   10/2005
(Continued)

*Primary Examiner* — Tri V Nguyen
(74) *Attorney, Agent, or Firm* — Hauptman Ham, LLP

(57) ABSTRACT

Disclosed are a carbon nanomaterial pellet and a method for preparing same. More particularly, it relates to a carbon nanomaterial pellet having a specific size and a high apparent density prepared by a simple process using only a rotary tablet press without mixing a carbon nanomaterial powder with a solvent or an additive, which is capable of solving the powder dust problem occurring when preparing a polymer composite from a carbon nanomaterial in the form of powder, thus improving physical properties and remarkably reducing cost of packaging and transportation, and a method for preparing the carbon nanomaterial pellet from a carbon nanomaterial powder.

2 Claims, 1 Drawing Sheet

(51) Int. Cl.
  *B82Y 30/00* (2011.01)
  *B29C 43/00* (2006.01)
  *B29B 9/08* (2006.01)
  *B29B 9/14* (2006.01)
  *B29K 105/00* (2006.01)
  *B29B 9/12* (2006.01)

(52) U.S. Cl.
  CPC .......... *H01B 1/24* (2013.01); *B29B 2009/125* (2013.01); *B29K 2105/251* (2013.01); *Y10T 428/2982* (2015.01)

(58) Field of Classification Search
  USPC ....................... 252/500–519.1; 977/778, 788
  See application file for complete search history.

(56) References Cited

U.S. PATENT DOCUMENTS

| | | | |
|---|---|---|---|
| 2003/0181568 A1* | 9/2003 | Amarasekera et al. | 524/495 |
| 2010/0159222 A1* | 6/2010 | Hata et al. | 428/218 |
| 2010/0189625 A1* | 7/2010 | Hisashi et al. | 423/415.1 |
| 2010/0201023 A1* | 8/2010 | Piccione et al. | 264/117 |
| 2011/0008617 A1* | 1/2011 | Hata et al. | 428/341 |
| 2012/0326342 A1* | 12/2012 | Tsunekawa et al. | 264/13 |
| 2013/0337707 A1* | 12/2013 | Hata et al. | 442/1 |
| 2014/0001415 A1* | 1/2014 | Sheng | B82Y 30/00 252/511 |

FOREIGN PATENT DOCUMENTS

| | | | | |
|---|---|---|---|---|
| CN | 102115558 A | * | 7/2011 | ............. C08L 23/06 |
| JP | 02-142856 A | | 5/1990 | |
| JP | 2007-012325 A | | 1/2007 | |
| JP | 2009-184849 A | | 8/2009 | |
| JP | 2009-184851 A | | 8/2009 | |
| JP | 2011-084844 A | | 4/2011 | |
| KR | 1020010049453 A | | 6/2001 | |
| KR | 100781628 B1 | | 12/2007 | |
| KR | 10-2010-0038094 | | 4/2010 | |
| KR | 10-0955295 | | 4/2010 | |
| KR | 10-2011-0065704 | | 6/2011 | |
| KR | 1020110097431 A | | 8/2011 | |
| KR | 20110115850 | * | 10/2011 | ............ C08L 101/00 |
| KR | 101330364 B1 | * | 11/2013 | ............. B01J 35/08 |
| WO | WO2011111559 | * | 9/2011 | ............. D02G 3/02 |
| WO | WO2012081601 | * | 6/2012 | ............. C01B 31/00 |

* cited by examiner

CARBON NANO-MATERIAL PELLETS AND A METHOD FOR PREPARING THE PELLETS FROM POWDER OF CARBON NANO-MATERIAL

CROSS-REFERENCE TO RELATED APPLICATIONS

This application claims priority under 35 U.S.C. §119 to Korean Patent Application No. 10-2012-0014514, filed on Feb. 13, 2012, in the Korean Intellectual Property Office, the disclosure of which is incorporated herein by reference in its entirety.

BACKGROUND (a) Technical Field

The present invention relates to a carbon nanomaterial pellet and a method for preparing same. More particularly, it relates to a carbon nanomaterial pellet having a specific size and a high apparent density prepared by a simple process using only a rotary tablet press without mixing a carbon nanomaterial powder with a solvent or an additive, which is capable of solving the powder dust problem occurring when preparing a polymer composite from a carbon nanomaterial in the form of powder, thus improving physical properties and remarkably reducing cost of packaging and transportation, and a method for preparing the carbon nanomaterial pellet from a carbon nanomaterial powder.

(b) Background Art

Carbon nanomaterials include fullerene, carbon nanotube (CNT), graphene, graphite nanoplate, etc. Among them, a carbon nanotube has a cylindrical nanostructure with a honeycomb-shaped sheet of graphite rolled to a diameter of nanometer scale and has specific characteristics depending on shape. The carbon nanotube is light since it has a hollow space, has good electrical conductivity comparable to that of copper, has good thermal conductivity comparable to that of diamond and has good tensile strength comparable to that of steel. It is also categorized as single-walled carbon nanotube (SWCNT), multi-walled carbon nanotube (MWCNT) or rope carbon nanotube according to the rolling type.

Owing to its superior physical properties, the carbon nanotube is drawing attentions as filler of various polymer composites, including antistatic polymer composites, EMI-shielding polymer composites, heat-resistant polymer composites, high-strength polymer composites, and so forth. Many researches and developments are underway for commercialization of polymer composites using the carbon nanotube.

However, despite the R&D efforts, the dust problem due to low apparent density of carbon nanotube powder and health issue arising therefrom remain as obstacles to the use of the carbon nanotube in polymer composites.

In general, the nanomaterial such as the carbon nanotube is used as mixed with a polymer pellet. When carbon nanomaterial powder is supplied to an extruder together with the polymer pellet, layer separation due to the large density difference of the carbon nanomaterial powder and the polymer pellet and dispersion problem of the carbon nanomaterial as a result thereof make large-scale use of the carbon nanomaterial difficult. Besides, in view of carbon nanomaterial producers, the very low apparent density of the carbon nanomaterial produced in the form of powder is the cause of increased cost of packaging and transportation.

Methods for improving apparent density of carbon nanomaterials, especially carbon nanotube, disclosed in the published patents include the followings.

Korean Patent No. 10-0955295 titled "Manufacturing method of shaped solid comprising nanocarbon" discloses a shaped solid comprising a nanocarbon, a metal (including oxide and ion) and a resin. However, since the prepared shaped solid comprises the metal and the resin to enhance binding for shaping the solid, when it is used in a polymer composite, a polymer used as a matrix may react with or be incompatible with the metal and the resin included in the solid, resulting in degradation of important physical properties of the nanocarbon. In addition, the method requires several steps of mixing of the nanocarbon with the metal and the resin, separation, shaping and drying.

Korean Patent Publication No. 2011-0065704 titled "Manufacturing method of nanocarbon shaped body and manufacturing method of nanocarbon shaped body, nanocarbon dispersed solution and nanocarbon material using same" discloses a method for manufacturing a nanocarbon shaped body comprising cutting a nanocarbon, mixing the nanocarbon with a dispersant and a solvent and dispersing the nanocarbon using a dispersing apparatus, flocculating the nanocarbon dispersed solution into a nanocarbon sludge by further adding a coagulant, removing a liquid component from the nanocarbon sludge and crushing or pulverizing same into a nanocarbon powder, and shaping the nanocarbon powder and drying same to prepare a nanocarbon shaped body. However, this method has a problem in that, although a metal or a resin is not included in the nanocarbon shaped body, the dispersant and the coagulant used during the manufacture may remain in the nanocarbon shaped body and cause unexpected negative effects when it is used to prepare a polymer composite. Further, the method also requires several steps.

Korean Patent Publication No. 2010-0038094 titled "Granulated product of carbon nanotube and method for production thereof", filed by Mikuni Shikiso Kabushiki Kaisha, discloses a method for producing a granulated product of a carbon nanotube wherein a carbon nanotube is granulated using a gas/liquid or liquid/liquid interface, using the carbon nanotube and a solvent at a weight ratio of at least 1:3. Although the apparent density of the carbon nanotube is increased by this method, the dust problem cannot be solved completely since fine carbon nanotube powder is included in the granulated product. Also, the method is not appropriate for large-scale production since mixing, degasing and drying steps are involved in the manufacturing process.

SUMMARY

The inventors of the present invention have made consistent efforts to solve the above-described problems, i.e. the problem of degradation of superior physical properties of carbon nanomaterial owing to inclusion of unwanted additives in the polymer composite, e.g. metal, resin or dispersant, during solidification of carbon nanomaterial powder, the dust problem owing to low apparent density of the carbon nanomaterial powder and the health problem occurring therefrom, the layer separation problem occurring when the carbon nanomaterial powder is supplied together with a polymer pellet to an extruder owing to the large density difference of the carbon nanomaterial powder and the polymer pellet, or the like. As a result, they have found out that these severe problems can be solved even with a simple process by pelletizing the carbon nanomaterial with a specific condition.

The present invention is directed to providing a carbon nanomaterial pellet having specific size and apparent density without including a solvent or an additive, thus being advantageous in terms of packaging and transportation.

The present invention is also directed to providing a carbon nanomaterial pellet maintaining the intrinsic physical properties of carbon nanomaterial powder when used in a polymer composite, thus allowing full utilization of the carbon nanomaterial.

The present invention is also directed to providing a method for preparing a carbon nanomaterial pellet whereby a carbon nanomaterial powder is pelletized by a simple and economic process.

The present invention is also directed to providing a method for pelletizing a carbon nanomaterial powder without addition of a solvent or an additive.

In an aspect, the present invention provides a carbon nanomaterial pellet not including a solvent or an additive, the pellet having a diameter of 2-6 mm, a thickness of 1-6 mm and an apparent density of 0.05-0.60 g/mL.

In another aspect, the present invention provides a method for preparing a carbon nanomaterial pellet including loading a carbon nanomaterial powder in a rotary tablet press without mixing with a solvent or an additive and applying pressure to shape the carbon nanomaterial powder into a pellet.

In another aspect, the present invention provides a method for preparing a carbon nanomaterial/polymer composite using a carbon nanomaterial pellet having a diameter of 2-6 mm, a thickness of 1-6 mm and an apparent density of 0.05-0.60 g/mL.

In another aspect, the present invention provides a carbon nanomaterial/polymer composite prepared using a carbon nanomaterial pellet having a diameter of 2-6 mm, a thickness of 1-6 mm and an apparent density of 0.05-0.60 g/mL.

Other features and aspects of the present invention will be apparent from the following detailed description, drawings and claims.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention, and wherein.

It should be understood that the appended drawings are not necessarily to scale, presenting a somewhat simplified representation of various preferred features illustrative of the basic principles of the invention. The specific design features of the invention as disclosed herein, including, for example, specific dimensions, orientations, locations and shapes, will be determined in part by the particular intended application and use environment.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a carbon nanomaterial pellet comprising only a carbon nanomaterial without any solvent or additive but and having a diameter of 2-6 mm, a thickness of 1-6 mm and an apparent density of 0.05-0.60 g/mL.

The carbon nanomaterial pellet of the present invention is prepared by pelletizing a carbon nanomaterial powder using a rotary tablet press.

In particular, in the present invention, the carbon nanomaterial powder is loaded in a rotary tablet press without being mixed with a solvent or an additive and pressure is applied to shape the powder into a pellet.

The carbon nanomaterial used in the present invention may be one or more selected from a group consisting of carbon nanotube, carbon nanofiber, graphene and graphite nanoplate. Specifically, carbon nanotube may be used.

Specifically, the carbon nanomaterial powder may have an average particle size of 0.05-100 μm, an apparent density of 0.01-0.20 g/mL and an angle of repose of 10-70°. More specifically, one having an average particle size of 0.1-85 μm, an apparent density of 0.01-0.20 g/mL and an angle of repose of 20-60° may be used.

If the powder does not satisfy the above conditions, a pellet may not be formed or a defective pellet may be formed.

The rotary tablet press used in the present invention may be a tablet press commonly used to prepare a tablet of drug, food, etc. During the pelletizing, the pressure applied to the carbon nanomaterial powder may be specifically 100-700 kg/cm$^2$, more specifically 300-500 kg/cm$^2$. If the pressure is too low, the pellet may be brittle. And, if the pressure is too high, the pelletizing is achieved easily but a polymer composite prepared using the carbon nanomaterial pellet may have poor physical properties.

Figure 1:
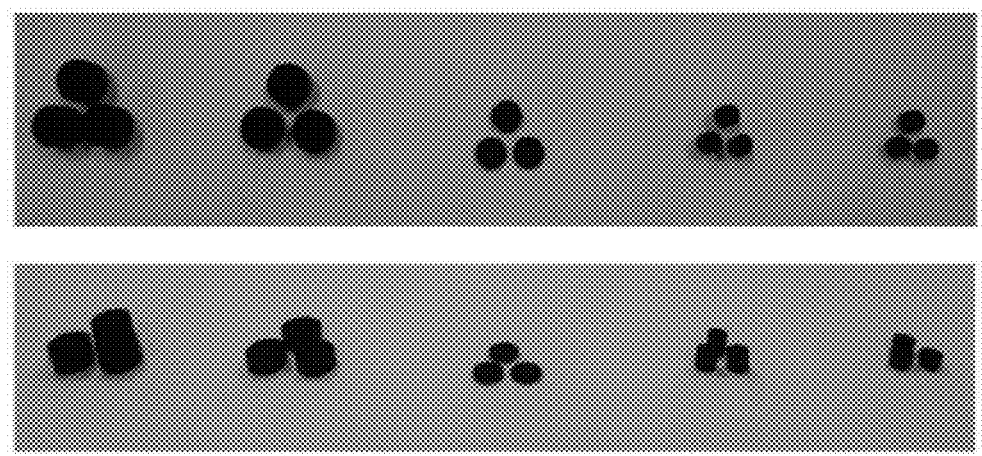
FIG. 1 shows a photograph of various carbon nanomaterial pellets prepared in Examples or Comparative Examples.
Figure 2:
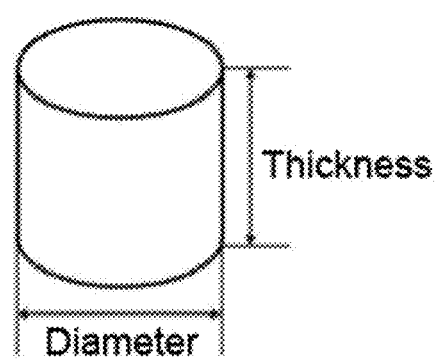
FIG. 2 schematically illustrates a carbon nanomaterial pellet prepared according to the present invention.

During the pelletizing, the rotary tablet press is operated with an adequately selected punch size and turntable rotation speed to form a pellet having specific size and apparent density, without mixing with a solvent or an additive. The prepared pellet may have a cylindrical shape as shown in FIG. 1 and FIG. 2. Specifically, the pellet may have a diameter of 2-6 mm, a thickness of 1-6 mm and an apparent density of 0.05-0.60 g/mL, more specifically a diameter of 2-6 mm, a thickness of 2-5 mm and an apparent density of 0.1-0.5 g/mL. When the diameter is too large, layer separation may occur owing to the size difference of the carbon nanomaterial pellet and the polymer pellet. In contrast, when the diameter is too small, productivity of the pellet preparation using the rotary tablet press may be low and layer separation may occur. When the thickness is too large, layer separation may occur owing to the size difference of the carbon nanomaterial pellet and the polymer pellet. In contrast, when the thickness is too small, it may not be easy to form the pellet and the pellet may be brittle. The apparent density affects the physical properties of the polymer composite prepared using the pellet and packaging and transportation of the pellet. When the apparent density is too high, the polymer composite prepared therefrom may have poor physical properties. In contrast, when the apparent density is too low, the effect of saving the cost of packaging and transportation is not significant. And, when the carbon nanomaterial powder used to prepare the pellet has an angle of repose of 10-70°, it may be easier to form the pellet using the rotary tablet press.

For preparation of the pellet according to the present invention, the rotary tablet press may be operated with a punch size of specifically 1-8 mm, more specifically 2-6 mm, and a turntable rotation speed of 10-60 rpm, specifically 20-50 rpm, in order to achieve good productivity and desired properties, i.e. diameter, thickness, apparent density, etc. of the pellet.

The pelletizing of the carbon nanomaterial powder according to the present invention requires no solvent or additive such as resin and may be carried out through a simple process.

Therefore, the carbon nanomaterial pellet prepared according to the present invention includes no solvent or additive and has a diameter of 2-6 mm, a thickness of 1-6 mm and an apparent density of 0.05-0.60 g/mL. Specifically, the carbon nanomaterial powder used for the pelletizing may have an angle of repose of 10-70°. When the angle of repose is in the above range, the pelletizing using the rotary tablet press may be performed easily.

As long as the pellet volume and apparent density are satisfied, the carbon nanomaterial pellet may be prepared into spherical, oval, cylindroid, triangular, square or hexagonal prismatic, or tetrahedral shape, in addition to the cylindrical shape shown in FIG. 1.

The present invention also provides a method for preparing a carbon nanomaterial/polymer composite using a carbon nanomaterial pellet having a to diameter of 2-6 mm, a thickness of 1-6 mm and an apparent density of 0.05-0.60 g/mL and the carbon nanomaterial/polymer composite prepared thereby.

A polymer material used to prepare the carbon nanomaterial/polymer composite may be one or more selected from a group consisting of polycarbonate, polyethylene terephthalate, amorphous polyethylene terephthalate, glycol-modified polyethylene terephthalate, cyclohexane-modified polyethylene terephthalate, polybutylene terephthalate, polyphenylene oxide, modified polyphenylene oxide, polyphenylene ether, polyether ketone, polyether ketone, polyethylene, polypropylene, polyacryl, polymethyl methacrylate, polysulfone, polyphenylene sulfide, polyethersulfone, sulfonated polybutylene terephthalate, polyetherimide, polyamide, polyamideimide, polyetheramide, polyacetal, acrylonitrile-butadiene-styrene, polystyrene, polyvinyl chloride, polyvinyl fluoride, polychlorotrifluoroethylene, polyurethane, ethylene propylene rubber, ethylene propylene diene monomer, polylactic acid, liquid crystal polymer, polycarbonate/acrylonitrile-butadiene-styrene, polycarbonate/cyclohexane-modified polyethylene terephthalate, acrylonitrile-butadiene-styrene/polyamide, polybutylene terephthalate/polyethylene terephthalate, polybutylene terephthalate/liquid crystal polymer, polysulfone/modified polyphenylene oxide, polypropylene/polyamide and polycarbonate/polylactic acid as a thermoplastic resin. 0.1-20 parts by weight of the carbon nanomaterial pellet may be used per 100 parts by weight of the polymer material.

The carbon nanomaterial pellet according to the present invention has an increased apparent density as compared to the general carbon nanomaterial in powder form, which has a very low apparent density. Accordingly, a more amount of carbon nanomaterial can be contained in a container of the same volume and the powder dust problem can be avoided. Thus, the present invention provides an excellent effect in packaging and transportation in terms of cost and convenience.

The carbon nanomaterial pellet according to the present invention is used to prepare a polymer composite in order to improve electrical and mechanical properties. It may be used to prepare the polymer composite in the same manner as the carbon nanomaterial powder is used to prepare the polymer composite.

When the carbon nanomaterial pellet according to the present invention is used to prepare the polymer composite together with a polymer pellet, it is mixed well with the polymer pellet and dispersed well because the size of the carbon nanomaterial pellet is similar to that of the polymer pellet. Accordingly, dispersibility can be improved and better improvement of the physical properties of the composite can be expected as compared to when powder is used.

Especially, since the carbon nanomaterial according to the present invention is in pellet form, the powder dust problem can be solved. Further, since the polymer material mixed with the carbon nanomaterial is usually in pellet form, the problem of layer separation occurring when the carbon nanomaterial is supplied together with the polymer pellet to an extruder to prepare a carbon nanomaterial/polymer composite due to the difference in size or density and the difficulty of supplying the pellet can be avoided. In addition, the purpose of using the carbon nanomaterial in the polymer composite, i.e. the physical properties of the composite such as electrical conductivity, mechanical property, etc., is not negatively affected as compared to when the carbon nanomaterial is used in powder form.

Besides, the dust problem owing to the low apparent density of the carbon nanomaterial powder, the health problem occurring therefrom and the layer separation problem occurring when the carbon nanomaterial powder is supplied together with a polymer pellet to an extruder owing to the large density difference of the carbon nanomaterial powder and the polymer pellet can be solved.

EXAMPLES

The present invention will be described in more detail through examples. The following examples are for illustrative purposes only and it will be apparent to those skilled in the art not that the scope of this invention is not limited by the examples.

Example 1

Without mixing with a solvent or an additive, a carbon nanotube powder having an average particle size of 0.1 μm, an apparent density of 0.06 g/mL and an angle of repose of 23° was supplied to a hopper of a rotary tablet press. After setting to a pellet thickness of 3 mm using a punch 2 mm in diameter, the rotary tablet press was operated at a turntable rotation speed of 20 rpm to prepare a carbon nanotube pellet having a diameter of 2 mm and a thickness of 3 mm. The prepared carbon nanotube pellet had an apparent density of 0.41 g/mL. FIG. 1 shows the prepared pellet.

Example 2

Without mixing with a solvent or an additive, a carbon nanotube powder having an average particle size of 0.1 μm, an apparent density of 0.06 g/mL and an angle of repose of 23° was supplied to a hopper of a rotary tablet press. After setting to a pellet thickness of 3 mm using a punch 3 mm in diameter, the rotary tablet press was operated at a turntable rotation speed of 20 rpm to prepare a carbon nanotube pellet having a diameter of 3 mm and a thickness of 3 mm. The prepared carbon nanotube pellet had an apparent density of 0.36 g/mL.

Example 3

Without mixing with a solvent or an additive, a carbon nanotube powder having an average particle size of 83 μm, an apparent density of 0.02 g/mL and an angle of repose of 58° was supplied to a hopper of a rotary tablet press. After setting to a pellet thickness of 2 mm using a punch 4 mm in diameter, the rotary tablet press was operated at a turntable rotation speed of 20 rpm to prepare a carbon nanotube pellet having a diameter of 4 mm and a thickness of 2 mm. The prepared carbon nanotube pellet had an apparent density of 0.12 g/mL.

Example 4

Without mixing with a solvent or an additive, a carbon nanotube powder having an average particle size of 83 μm, an apparent density of 0.02 g/mL and an angle of repose of 58° was supplied to a hopper of a rotary tablet press. After setting to a pellet thickness of 3 mm using a punch 4 mm in diameter, the rotary tablet press was operated at a turntable rotation speed of 20 rpm to prepare a carbon nanotube pellet having a diameter of 4 mm and a thickness of 3 mm. The prepared carbon nanotube pellet had an apparent density of 0.09 g/mL.

Example 5

Without mixing with a solvent or an additive, a carbon nanotube powder having an average particle size of 67 μm, an apparent density of 0.034 g/mL and an angle of repose of 45° was supplied to a hopper of a rotary tablet press. After setting to a pellet thickness of 4 mm using a punch 4 mm in diameter, the rotary tablet press was operated at a turntable rotation speed of 20 rpm to prepare a carbon nanotube pellet having a diameter of 4 mm and a thickness of 4 mm. The prepared carbon nanotube pellet had an apparent density of 0.18 g/mL.

Example 6

Without mixing with a solvent or an additive, a carbon nanotube powder having an average particle size of 67 μm, an apparent density of 0.034 g/mL and an angle of repose of 45° was supplied to a hopper of a rotary tablet press. After setting to a pellet thickness of 5 mm using a punch 4 mm in diameter, the rotary tablet press was operated at a turntable rotation speed of 20 rpm to prepare a carbon nanotube pellet having a diameter of 4 mm and a thickness of 5 mm. The prepared carbon nanotube pellet had an apparent density of 0.16 g/mL.

Example 7

Without mixing with a solvent or an additive, a carbon nanotube powder having an average particle size of 15 μm, an apparent density of 0.042 g/mL and an angle of repose of 31° was supplied to a hopper of a rotary tablet press. After setting to a pellet thickness of 4 mm using a punch 5 mm in diameter, the rotary tablet press was operated at a turntable rotation speed of 20 rpm to prepare a carbon nanotube pellet having a diameter of 5 mm and a thickness of 4 mm. The prepared carbon nanotube pellet had an apparent density of 0.24 g/mL.

Example 8

Without mixing with a solvent or an additive, a carbon nanotube powder having an average particle size of 15 μm, an apparent density of 0.042 g/mL and an angle of repose of 31° was supplied to a hopper of a rotary tablet press. After setting to a pellet thickness of 4 mm using a punch 6 mm in diameter, the rotary tablet press was operated at a turntable rotation speed of 20 rpm to prepare a carbon nanotube pellet having a diameter of 6 mm and a thickness of 4 mm. The prepared carbon nanotube pellet had an apparent density of 0.21 g/mL.

Comparative Example 1

Excessive Pellet Diameter

Without mixing with a solvent or an additive, a carbon nanotube powder having an average particle size of 15 μm, an apparent density of 0.042 g/mL and an angle of repose of 31° was supplied to a hopper of a rotary tablet press. After setting to a pellet thickness of 4 mm using a punch 1.5 mm in diameter, the rotary tablet press was operated at a turntable rotation speed of 20 rpm to prepare a carbon nanotube pellet having a diameter of 1.5 mm and a thickness of 4 mm. The prepared carbon nanotube pellet had an apparent density of 0.27 g/mL.

Comparative Example 2

Excessive Pellet Diameter

Without mixing with a solvent or an additive, a carbon nanotube powder having an average particle size of 15 μm, an apparent density of 0.042 g/mL and an angle of repose of 31° was supplied to a hopper of a rotary tablet press. After setting to a pellet thickness of 4 mm using a punch 7 mm in diameter, the rotary tablet press was operated at a turntable rotation speed of 20 rpm to prepare a carbon nanotube pellet having a diameter of 7 mm and a thickness of 4 mm. The prepared carbon nanotube pellet had an apparent density of 0.19 g/mL.

Comparative Example 3

Excessive Pellet Thickness

Without mixing with a solvent or an additive, a carbon nanotube powder having an average particle size of 83 μm, an apparent density of 0.02 g/mL and an angle of repose of 58° was supplied to a hopper of a rotary tablet press. After setting to a pellet thickness of 0.8 mm using a punch 4 mm in diameter, the rotary tablet press was operated at a turntable rotation speed of 20 rpm to prepare a carbon nanotube pellet having a diameter of 4 mm and a thickness of 0.8 mm. The prepared carbon nanotube pellet had an apparent density of 0.16 g/mL.

Comparative Example 4

Excessive Pellet Thickness

Without mixing with a solvent or an additive, a carbon nanotube powder having an average particle size of 83 μm, an apparent density of 0.02 g/mL and an angle of repose of 58° was supplied to a hopper of a rotary tablet press. After setting to a pellet thickness of 7 mm using a punch 4 mm in diameter, the rotary tablet press was operated at a turntable rotation speed of 20 rpm to prepare a carbon nanotube pellet having a diameter of 4 mm and a thickness of 7 mm. The prepared carbon nanotube pellet had an apparent density of 0.06 g/mL.

Comparative Example 5

Excessive Pellet Apparent Density

Without mixing with a solvent or an additive, a carbon nanotube powder having an average particle size of 83 μm, an apparent density of 0.02 g/mL and an angle of repose of 58° was supplied to a hopper of a rotary tablet press. After setting to a pellet thickness of 6 mm using a punch 6 mm in diameter, the rotary tablet press was operated at a turntable rotation speed of 20 rpm to prepare a carbon nanotube pellet having a diameter of 6 mm and a thickness of 6 mm. The prepared carbon nanotube pellet had an apparent density of 0.04 g/mL.

Comparative Example 6

Excessive Pellet Apparent Density

Without mixing with a solvent or an additive, a carbon nanotube powder having an average particle size of 0.1 μm, an apparent density of 0.08 g/mL and an angle of repose of 20° was supplied to a hopper of a rotary tablet press. After setting to a pellet thickness of 1 mm using a punch 2 mm in diameter, the rotary tablet press was operated at a turntable rotation speed of 20 rpm to prepare a carbon nanotube pellet having a diameter of 2 mm and a thickness of 1 mm. The prepared carbon nanotube pellet had an apparent density of 0.70 g/mL.

Comparative Example 7

Excessive Powder Average Particle Size

Without mixing with a solvent or an additive, a carbon nanotube powder having an average particle size of 0.04 μm, an apparent density of 0.12 g/mL and an angle of repose of 63° was supplied to a hopper of a rotary tablet press. Although the rotary tablet press was operated to prepare a pellet, a pellet having a diameter of 2-6 mm, a thickness of 1-6 mm and an apparent density of 0.05-0.60 g/mL was not prepared.

Comparative Example 8

Excessive Powder Average Particle Size

Without mixing with a solvent or an additive, a carbon nanotube powder having an average particle size of 114 μm, an apparent density of 0.017 g/mL and an angle of repose of 43° was supplied to a hopper of a rotary tablet press. Although the rotary tablet press was operated to prepare a pellet, a pellet having a diameter of 2-6 mm, a thickness of 1-6 mm and an apparent density of 0.05-0.60 g/mL was not prepared.

Comparative Example 9

Excessive Powder Apparent Density

Without mixing with a solvent or an additive, a carbon nanotube powder having an average particle size of 90 μm, an apparent density of 0.008 g/mL and an angle of repose of 56° was supplied to a hopper of a rotary tablet press. Although the rotary tablet press was operated to prepare a pellet, a pellet having a diameter of 2-6 mm, a thickness of 1-6 mm and an apparent density of 0.05-0.60 g/mL was not prepared.

Comparative Example 10

Excessive Powder Apparent Density

Without mixing with a solvent or an additive, a carbon nanotube powder having an average particle size of 0.08 μm, an apparent density of 0.21 g/mL and an angle of repose of 54° was supplied to a hopper of a rotary tablet press. Although the rotary tablet press was operated to prepare a pellet, a pellet having a diameter of 2-6 mm, a thickness of 1-6 mm and an apparent density of 0.05-0.60 g/mL was not prepared.

Comparative Example 11

Excessive Powder Angle of Repose

Without mixing with a solvent or an additive, a carbon nanotube powder having an average particle size of 95 μm, an apparent density of 0.15 g/mL and an angle of repose of 8° was supplied to a hopper of a rotary tablet press. Although the rotary tablet press was operated to prepare a pellet, a pellet having a diameter of 2-6 mm, a thickness of 1-6 mm and an apparent density of 0.05-0.60 g/mL was not prepared.

Comparative Example 12

Excessive Powder Angle of Repose

Without mixing with a solvent or an additive, a carbon nanotube powder having an average particle size of 6 μm, an apparent density of 0.013 g/mL and an angle of repose of 75° was supplied to a hopper of a rotary tablet press. Although the rotary tablet press was operated to prepare a pellet, a pellet having a diameter of 2-6 mm, a thickness of 1-6 mm and an apparent density of 0.05-0.60 g/mL was not prepared.

The carbon nanotube pellets prepared in Examples and Comparative Examples are shown in FIG. 1 and the result is summarized in Tables 1-3.

TABLE 1

|  |  | Examples | | | | | | | |
| --- | --- | --- | --- | --- | --- | --- | --- | --- | --- |
|  |  | 1 | 2 | 3 | 4 | 5 | 6 | 7 | 8 |
| Powder used | Average particle size (μm) | 0.1 | 0.1 | 83 | 83 | 67 | 67 | 15 | 15 |
|  | Apparent density (g/mL) | 0.06 | 0.06 | 0.02 | 0.02 | 0.034 | 0.034 | 0.042 | 0.042 |
|  | Angle of repose (°) | 23 | 23 | 58 | 58 | 45 | 45 | 31 | 31 |
| Pellet | Diameter (mm) | 2 | 3 | 4 | 4 | 4 | 4 | 5 | 6 |
|  | Thickness (mm) | 3 | 3 | 2 | 3 | 4 | 5 | 4 | 4 |
|  | Apparent density (g/mL) | 0.41 | 0.36 | 0.12 | 0.09 | 0.18 | 0.16 | 0.24 | 0.21 |

TABLE 2

| | | Comparative Examples | | | | | |
|---|---|---|---|---|---|---|---|
| | | 1 | 2 | 3 | 4 | 5 | 6 |
| Powder used | Average particle size (μm) | 15 | 15 | 83 | 83 | 83 | 0.1 |
| | Apparent density (g/mL) | 0.042 | 0.042 | 0.02 | 0.02 | 0.02 | 0.08 |
| | Angle of repose (°) | 31 | 31 | 58 | 58 | 58 | 20 |
| Pellet | Diameter (mm) | 1.5 | 7 | 4 | 4 | 6 | 2 |
| | Thickness (mm) | 4 | 4 | 0.8 | 7 | 6 | 1 |
| | Apparent density (g/mL) | 0.27 | 0.19 | 0.16 | 0.06 | 0.04 | 0.70 |
| Note | | excessive diameter | | excessive thickness | | excessive apparent density | |

TABLE 3

| | | Comparative Examples | | | | | |
|---|---|---|---|---|---|---|---|
| | | 7 | 8 | 9 | 10 | 11 | 12 |
| Powder used | Average particle size (μm) | 0.04 | 114 | 90 | 0.08 | 95 | 6 |
| | Apparent density (g/mL) | 0.12 | 0.017 | 0.008 | 0.21 | 0.15 | 0.013 |
| | Angle of repose (°) | 63 | 43 | 56 | 54 | 8 | 75 |
| Pellet | Diameter (mm) | not prepared | not prepared | not prepared | not prepared | not prepared | not prepared |
| | Thickness (mm) | | | | | | |
| | Apparent density (g/mL) | | | | | | |
| Note | | excessive average particle size | | excessive apparent density | | excessive angle of repose | |

As seen from Table 1, carbon nanotube pellets with various diameters, thicknesses and apparent densities could be prepared from carbon nanotube powder through a single process using the rotary tablet press without having to mix with a solvent or an additive.

And, as seen from Tables 2 and 3, when carbon nanotube powder fails to meet the condition of average particle size (0.05-100 μm), apparent density (0.01-0.20 g/mL) or angle of repose)(10-70°) as in Comparative Examples 7-12, a pellet having a diameter of 2-6 mm, a thickness of 1-6 mm and an apparent density of 0.05-0.60 g/mL could not be prepared.

Preparation Example 1

The carbon nanotube pellet prepared in Example 1 was sufficiently mixed with a polycarbonate/acrylonitrile-butadiene-styrene copolymer (PC/ABS) compound (HAC-8265, Kumho Petrochemical) using a small tumbler mixer such that the content of the carbon nanotube was 3 wt %. After extruding using a twin-screw extruder ($\phi$=30 mm, L/D=36) at 240-290° C., followed by cooling and solidification, the resulting pellet was dried for 4 hours in a convection oven maintained at 80° C. Thereafter, a polymer composite sample was prepared by injection molding at 250-300° C. using a 160-ton injection molding machine with the mold temperature kept at 65° C.

Preparation Example 2

A polymer composite sample was prepared in the same manner as in Preparation Example 1 except for using the carbon nanotube pellet prepared in Example 2.

Preparation Example 3

A polymer composite sample was prepared in the same manner as in Preparation Example 1 except for using the carbon nanotube pellet prepared in Example 3.

Preparation Example 4

A polymer composite sample was prepared in the same manner as in Preparation Example 1 except for using the carbon nanotube pellet prepared in Example 4.

Preparation Example 5

A polymer composite sample was prepared in the same manner as in Preparation Example 1 except for using the carbon nanotube pellet prepared in Example 5.

Preparation Example 6

A polymer composite sample was prepared in the same manner as in Preparation Example 1 except for using the carbon nanotube pellet prepared in Example 6.

Preparation Example 7

A polymer composite sample was prepared in the same manner as in Preparation Example 1 except for using the carbon nanotube pellet prepared in Example 7.

Preparation Example 8

A polymer composite sample was prepared in the same manner as in Preparation Example 1 except for using the carbon nanotube pellet prepared in Example 8.

Comparative Preparation Example 1

A polymer composite sample was prepared in the same manner as in Preparation Example 1 except for using the carbon nanotube pellet prepared in Comparative Example 1.

Comparative Preparation Example 2

A polymer composite sample was prepared in the same manner as in Preparation Example 1 except for using the carbon nanotube pellet prepared in Comparative Example 2.

Comparative Preparation Example 3

A polymer composite sample was prepared in the same manner as in Preparation Example 1 except for using the carbon nanotube pellet prepared in Comparative Example 3.

Comparative Preparation Example 4

A polymer composite sample was prepared in the same manner as in Preparation Example 1 except for using the carbon nanotube pellet prepared in Comparative Example 4.

Comparative Preparation Example 5

A polymer composite sample was prepared in the same manner as in Preparation Example 1 except for using the carbon nanotube pellet prepared in Comparative Example 5.

Comparative Preparation Example 6

A polymer composite sample was prepared in the same manner as in Preparation Example 1 except for using the carbon nanotube pellet prepared in Comparative Example 6.

Comparative Preparation Example 7

A polymer composite sample was prepared in the same manner as in Preparation Example 1 except for using a carbon nanotube powder having an average particle size of 15 μm, an apparent density of 0.042 g/mL and an angle of repose of 31° instead of using the carbon nanotube pellet prepared in Examples or Comparative Examples. The content of the carbon nanotube powder was 3 wt % of the compound as in Preparation Example 1.

Test Example

Physical properties of the carbon nanomaterial/polymer composite samples prepared in Preparation Examples and Comparative Preparation Examples were tested as follows. Izod impact strength was measured according to ASTM D256 (⅛ inch). Surface resistance was measured for after injection molding a test sample of 100 mm×50 mm×2 mm using the TRUSTAT-Worksurface tester. The result is shown in Tables 4 and 5.

As seen from Tables 4 and 5, when the carbon nanotube powder pellet having a diameter of 2-6 mm, a thickness of 1-6 mm and an apparent density of 0.05-0.60 g/mL prepared according to the present invention was used to prepare the carbon nanotube/polymer composite (Preparation Examples 1-8), the carbon nanotube powder dust problem and the layer separation problem due to the large density difference of the carbon nanomaterial powder and the polymer pellet could be solved. And, the carbon nanotube/polymer composite showed comparable or slightly improved physical properties such as Izod impact strength and surface resistance as compared to when the carbon nanotube powder was used (Comparative Preparation Example 7). The reason why the carbon nanotube/polymer composites of Preparation Examples showed slight improvement is because the pellet according to the present invention is different in shape from powder. When the carbon nanotube powder pellet not having a diameter of 2-6 mm, a thickness of 1-6 mm or an apparent density of 0.05-0.60 g/mL was used to prepare the carbon nanotube/polymer composite (Comparative Preparation Examples 1-6), the carbon nanotube powder dust problem and the layer separation problem could not be solved completely. And, the carbon nanotube/polymer composites showed worse physical properties such as Izod impact strength and surface resistance as compared to when the carbon nanotube powder was used (Comparative Preparation Example 7), suggesting that the size and apparent density of the pellet are important factors.

Since the carbon nanomaterial pellet according to the present invention includes no solvent or additive such as metal, resin, dispersant, etc., undesired deterioration of physical properties of a polymer composite or health problem may be avoided. When used to prepare a polymer composite, it provides a comparable effect as compared to when carbon nanomaterial in powder form is used, without layer separation or deterioration of physical properties.

Further, in accordance with the present invention, the pellet can be prepared by a very simple process using a tablet

TABLE 4

|  | Preparation Examples | | | | | | | |
| --- | --- | --- | --- | --- | --- | --- | --- | --- |
|  | 1 | 2 | 3 | 4 | 5 | 6 | 7 | 8 |
| Content of carbon nanotube | 3 wt % | | | | | | | |
| Content of thermoplastic resin | 97 wt % | | | | | | | |
| Izod impact strength | 67 | 67 | 69 | 69 | 68 | 68 | 67 | 66 |
| Surface resistance (Log Ω/□) | 4.05 | 4.07 | 4.08 | 4.07 | 4.05 | 4.01 | 4.11 | 4.15 |
| Carbon nanotube powder dust | ⊚ | ⊚ | ⊚ | ⊚ | ⊚ | ⊚ | ⊚ | ⊚ |
| Layer separation of carbon nanotube powder | ⊚ | ⊚ | ⊚ | ⊚ | ⊚ | ⊚ | ⊚ | ⊚ |

TABLE 5

|  | Comparative Preparation Examples | | | | | | |
| --- | --- | --- | --- | --- | --- | --- | --- |
|  | 1 | 2 | 3 | 4 | 5 | 6 | 7 |
| Content of carbon nanotube | 3 wt % | | | | | | |
| Content of thermoplastic resin | 97 wt % | | | | | | |
| Izod impact strength | 65 | 63 | 65 | 64 | 65 | 62 | 67 |
| Surface resistance (Log Ω/□) | 4.87 | 4.73 | 5.68 | 4.79 | 4.95 | 5.50 | 4.10 |
| Carbon nanotube powder dust | ⊚ | ○ | ⊚ | ○ | ○ | ⊚ | X |
| Layer separation of carbon nanotube powder | ⊚ | Δ | ⊚ | ○ | Δ | ⊚ | X |

(Note)
Carbon nanotube powder dust: ⊚: no dust, ○: slight dust, Δ: dust, X: severe dust
Layer separation of carbon nanotube powder: ⊚: no separation, ○: slight separation, Δ: separation, X: severe separation press without having to mix the carbon nanomaterial powder with a solvent or an additive.

In addition, use of the pellet prepared according to the present invention solves the dust problem occurring when carbon nanomaterial powder is used and remarkably improves packaging and transportation, thus providing advantages in terms of cost and health during manufacturing and transportation of products.

Accordingly, the present invention allows the full utilization of the carbon nanomaterial powder economically and effectively.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A carbon nanomaterial/polymer composite comprising:
   a carbon nanomaterial not including a solvent or an additive; and
   one or more polymer selected from a group consisting of polycarbonate, polyethylene terephthalate, amorphous polyethylene terephthalate, glycol-modified polyethylene terephthalate, cyclohexane-modified polyethylene terephthalate, polybutylene terephthalate, polyphenylene oxide, modified polyphenylene oxide, polyphenylene ether, polyether ketone, polyether ketone ketone, polyethylene, polypropylene, polyacryl, polymethyl methacrylate, polysulfone, polyphenylene sulfide, polyethersulfone, sulfonated polybutylene terephthalate, polyetherimide, polyamide, polyamideimide, polyetheramide, polyacetal, acrylonitrile-butadiene- styrene, polystyrene, polyvinyl chloride, polyvinyl fluoride, polychlorotrifluoroethylene, polyurethane, ethylene propylene rubber, ethylene propylene diene monomer, polylactic acid, liquid crystal polymer, polycarbonate/acrylonitrile-butadiene-styrene, polycarbonate/cyclohexane-modified polyethylene terephthalate, acrylonitrile-butadiene-styrene/polyamide, polybutylene terephthalate/polyethylene terephthalate, polybutylene terephthalate/liquid crystal polymer, polysulfone/modified polyphenylene oxide, polypropylene/polyamide, and polycarbonate/polylactic acid as a thermoplastic resin, wherein
   the carbon nanomaterial comes from a carbon nanomaterial pellet having a diameter of 3 millimeters (mm)-5 mm, a thickness of 3 mm-5 mm and an apparent density of 0.05-0.60 g/mL, the carbon nanomaterial is one or more selected from a group consisting of carbon nanotube, carbon nanofiber, graphene and graphite nanoplate,
   the polymer comes from a polymer pellet having a diameter and thickness corresponding to that of the carbon nanomaterial pellet, and
   the size of the carbon nanomaterial pellet is the same as that of the polymer pellet to improve dispersibility of the carbon nanomaterial and the polymer.

2. The carbon nanomaterial/polymer composite according to claim 1, wherein a carbon nanomaterial powder used to prepare the pellet has an angle of repose of 10-70°.

* * * * *